April 11, 1961 A. J. LOEPSINGER 2,978,763
METHOD OF MAKING DIAPHRAGM VALVE COMPRESSORS
Original Filed Sept. 15, 1954 2 Sheets-Sheet 1

INVENTOR.
ALBERT J. LOEPSINGER
BY
David D. McKenney
ATTORNEY

April 11, 1961   A. J. LOEPSINGER   2,978,763
METHOD OF MAKING DIAPHRAGM VALVE COMPRESSORS
Original Filed Sept. 15, 1954   2 Sheets-Sheet 2

INVENTOR.
ALBERT J. LOEPSINGER
BY
David D. McKenney
ATTORNEY

United States Patent Office 2,978,763
Patented Apr. 11, 1961

2,978,763
METHOD OF MAKING DIAPHRAGM VALVE COMPRESSORS

Albert J. Loepsinger, Providence, R.I., assignor to Grinnell Corporation, Providence, R.I., a corporation of Delaware Original application Sept. 15, 1954, Ser. No. 456,141, now Patent No. 2,936,998, dated May 17, 1960. Divided and this application June 20, 1957, Ser. No. 667,010

4 Claims. (Cl. 22—195)

The present invention relates to improvements in method of making diaphragm valve compressors and more particularly to an improved compressor and method of making the same.

Heretofore, in diaphragm valve constructions it has been found to be advantageous in certain installations to utilize diaphragms of molded construction and wherein the diaphragm normally assumes an open position. The reason has been that the diaphragm when open will provide a preformed smooth surface which will be continuous with respect to the passageways leading to and from the valve so that flow through the valve will be smooth. Especially, where the diaphragm valve body construction embodies a weir that extends across the passageway and substantially interrupts straight-through flow, the diaphragm is preformed of resilient material to assume a substantially concave shape, as by molding, so that with the valve open, the flow passageway at the weir is of substantially the same cross-sectional area as the rest of the passageway.

In such valves, closure is effected by forcing a transverse portion of the diaphragm into pressure tight relationship with an upstanding weir through the medium of a compressor having generally the contour of the weir modified to accommodate the thickness of the diaphragm. To open the valve and permit flow therethrough, the compressor is, with the diaphragm centrally attached thereto, moved away from the weir. Thus, it is seen that the amount of opening which determines the area provided for free flow depends upon the distance through which the diaphragm may be repeatedly flexed without failure in view of the fact that in use many valves must be opened and closed frequently. It is of great practical importance that the diaphragm should be long lived since replacement thereof usually requires draining of the system and removal of the valve bonnet. To meet this requirement for a reasonably long life, it has been the practice to restrict the movement of the diaphragm to an amount much less than the diameter of the pipe line in which the valve is installed. This debars the attainment of the preferable passageway, that is, one having a substantially circular cross section as does the pipe. Added flow area is provided by making the diaphragm greater in diameter than the pipe. This produces a passageway at the weir of generally elliptical shape, with the minor diameter thereof equal to the amount the diaphragm flexes. It has been the practice to so form the compressor of the valve as to have a shape obverse from that of the diaphragm in its open position. Thus, upon closing movement of the compressor, the diaphragm will be flexed from its concave configuration to its obverse shape when in seating engagement with the weir or other seating surface, the portions of the compressor other than the transverse portion thereof distorting the cooperative diaphragm portions and providing backing support for the latter. Such backing support has been found to be necessary so that the pressure in the pipe line will not injuriously act on the diaphragm. However, because up to the present time the compressor has been formed with a surface shape obverse from that of the diaphragm in its open position, all portions of the diaphragm other than the marginally clamped portion are forcibly distorted to the obverse shape when the compressor is moved to its closed position. This, of course, forces the transverse portion of the diaphragm into proper seating engagement with the weir. I have discovered that the severe flexing the diaphragm endures can be substantially reduced, thereby prolonging the diaphragm life and reducing the force required to effect closing movement of the diaphragm. This is accomplished by forming the compressor surface so that only the transverse portion thereof forcibly distorts the diaphragm to its weir-engaging position, the remainder of the diaphragm, except for the marginally clamped portion, being free to assume a contour which, while distorted from its original preformed shape, is not additionally distorted by the portions of the compressor cooperative therewith. In order to support the diaphragm against the line pressure, the compressor is made with a surface corresponding in shape with the contour of the diaphragm portions other than the transverse and marginally clamped portions, when in the closed position.

An advantage to the foregoing is that because the stress of flexing the diaphragm is reduced the travel of the central portion of the diaphragm can be increased without undesirably shortening the diaphragm life. Thus, the passageway over the weir can be changed from the substantially elliptical shape above described to one approximating the circular passageway of the pipe.

Accordingly, it is an object of the present invention to provide an improved diaphragm valve construction wherein severe flexing of the diaphragm is materially reduced so as either to substantially lengthen the diaphragm life in terms of the number of closures that the diaphragm will endure or to make possible an increase in the travel of the central portion of the diaphragm.

Another object of the present invention is to provide an improved diaphragm valve construction wherein the flexure of the diaphragm during closing movement thereof is limited to the extent necessary to effect seating of the diaphragm along the weir or other seating surface.

A further object of the present invention is to provide an improved diaphragm valve construction wherein only the portion of the diaphragm to be seated is positively flexed by the compressor into seating engagement with the weir or other seating surface, the remainder of the diaphragm, except for the clamped margin, being substantially free to assume a naturally distorted configuration in consequence of the seating of that diaphragm portion.

Still another object of the present invention is to provide an improved diaphragm valve construction wherein the compressor is so formed that only the portion of the diaphragm to be seated is positively flexed from its open position into seating engagement with the weir or other seating surface, while the remaining portion of the diaphragm is free to naturally distort but wherein the shape of the compressor is such as to provide a backing for the naturally distorted portion.

A still further object of the present invention is to so form the compressor that stresses in the diaphragm in moving from one extreme position to the other extreme position will be minimized thereby making possible greater flexing of the diaphragm, without reducing the diaphragm life, and accompanying improvement in the shape of the passageway over the weir.

A further object of the present invention is to devise a method of making compressors which will satisfy the foregoing objects.

In the preceding discussion and listing of the objects, and wherein the valve construction embodied a weir, modification of the compressor is of primary concern. In this connection, it is to be noted that weirs are generally formed with a smooth concave seating surface extending from one side of the valve body lateral opening to the other side thereof so that with the diaphragm, a subtantially circular, elliptical or oval opening is defined which substantially corresponds with the passageway or bore through the valve. Such construction and opening shape lends itself to cleaning by ball brush and other known means. Also, the flow characteristics through such a valve construction are of a desirable nature. However, in installations where the life of the diaphragm is the primary consideration and the flow characteristics are of secondary importance, the principles of my invention can be extended from the modification of the compressor alone to modification of both the compressor and the configuration of the seating surface.

Broadly speaking, where modification of the compressor alone is desired, a special compressor is made which includes a pair of transverse fingers. That compressor is mounted in a substantially conventional diaphragm valve having a partially cut-away bonnet. The compressor is moved to closed position with the pair of fingers forcing the diaphragm from its normally open position to a closed position against the seating surface. The remainder of the diaphragm, except for the marginally clamped portion, is then free to naturally distort. A form is made of the exposed back face of the diaphragm portion that is naturally distorted. From the form thus made, a compressor is constructed which has not only the transverse portion for forcing the diaphragm to seat but also backing portions for the naturally distorted portions of the diaphragm. The backing portions thus formed exert substantially no pressure on the diaphragm but are provided to support the diaphragm when the line pressure is acting thereagainst.

Where the life of the diaphragm is of primary concern, an improved diaphragm valve construction can be provided wherein both the diaphragm compressor and the weir are so formed as to obviate unnecessary severe flexing of the diaphragm without affecting the seating characteristics of the valve.

Generally speaking where modification of the weir is not objectionable, the procedure is as follows. The special compressor here utilized is not provided with the pair of transverse fingers as above, but essentially consists of a stem acting only on the center of the diaphragm. With the latter, special compressor installed, and the diaphragm moved to its closed position, it will be seen that all but the central and marginal portions of the diaphragm will be free and will assume a naturally distorted configuration. It will be understood that the closed position of the diaphragm can be varied to a certain extent. A form is then made of the back side of the diaphragm and a compressor corresponding in shape to the form is then made as in the manner above described. The weir in the valve body is then constructed to be complementary to the compressor configuration across its seating portion, taking in account the interposition of the diaphragm.

Figure 9:
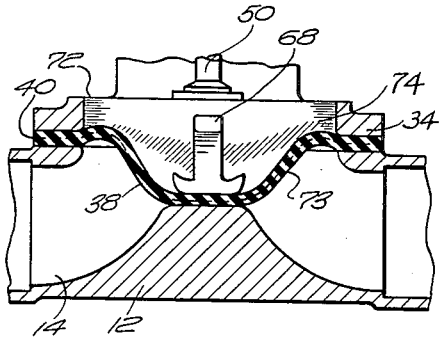
Figure 9 is a view similar to Figure 8 but showing that plaster has been poured over the back surface of the diaphragm.
Figure 10:
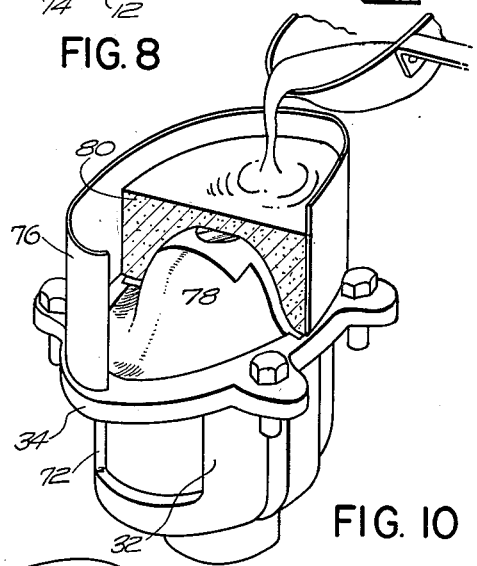
Figure 11:
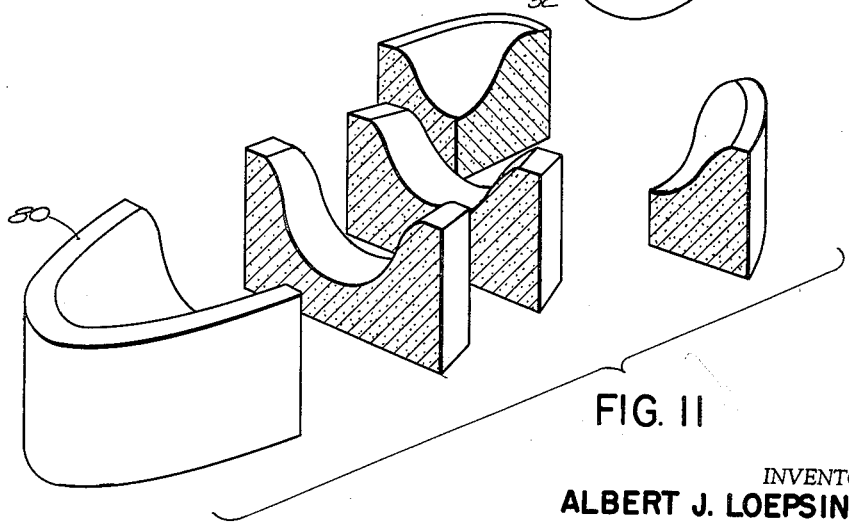

Figure 10 shows the bonnet and compressor structure of Figure 9 removed as a unit and inverted, with a curved sheet of material mounted about the plaster to provide a retainer for the plaster shown being poured in Figure 10 whereby a female casting is formed (parts being shown in section for clarity); and Figure 11 is a perspective exploded view of the casting of Figure 10 as sectioned to give the transverse and longitudinal elements of curvature of the back surface of the diaphragm.

Referring now more particularly to the drawings wherein like numerals designate like parts throughout, and having particular reference to Figures 1–6, it will be seen that a diaphragm-type valve 10 is shown which is comprised of a body 12 with a passageway or bore 14 therethrough terminating in socket ends 16 and 18 for connection in a pipe line (not shown). Between the socket ends 16 and 18 and extending transversely of the passageway 14 is a weir formation 20 which provides anarcuate seating surface at 22. The passageway 14 is smoothly curved from the socket ends 16 and 18 to the seating surface 22 for the purpose of streamlining the flow through the valve body. At the side of the body opposing the seating surface an opening 24 is formed, the opening being of substantially oval shape although it will be understood that other shapes of openings can be employed as desired. The valve body 12 is formed with an encircling projecting portion or flange 26 about the opening 24 and the seating surface 22 curved upwardly to merge with the upper surface of the flange 26 as at 30.

Over the opening 24 is disposed a dome-shaped bonnet 32, the lower end of which is formed with a projecting portion or flange 34 corresponding to the flange 26 whereby bolts 36 are utilized to secure the bonnet 32 at the body flange 26. A diaphragm 38 has its peripheral portion 40 secured between the flanges 26 and 34. The diaphragm 38 can be of any desired formation, as for example, the diaphragm can be constructed from rubber, rubber with a fabric lamination, plastic, plastic with a separate backing sheet, or any other suitable resilient material. Preferably the diaphragm is of molded construction with its normal shape corresponding to a full open position as shown in Figure 1.

Figure 1:
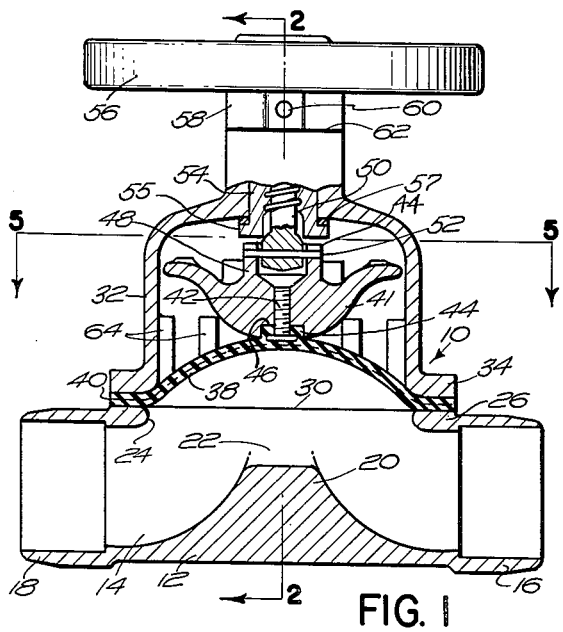
Figure 1 is a vertical longitudinal sectional view through a diaphragm valve embodying the improvements of the present invention, with the compressor in open position.
Figure 2:
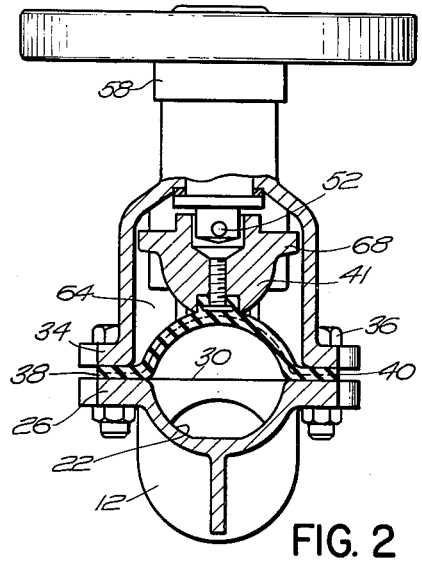
Figure 2 is a vertical transverse sectional view taken substantially along the plans of line 2—2 of Figure 1.
Figure 3:
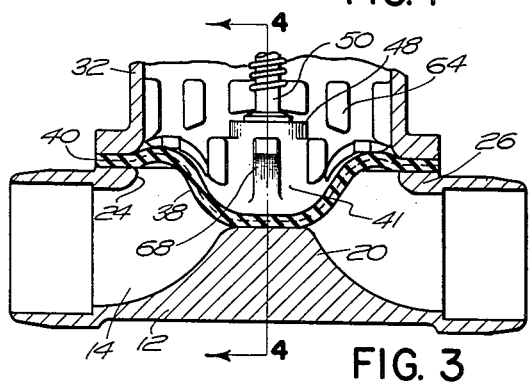
Figure 3 is a view similar to Figure 1 but with part of the valve operating structure broken away and the compressor in side elevation and in closed position.
Figure 4:
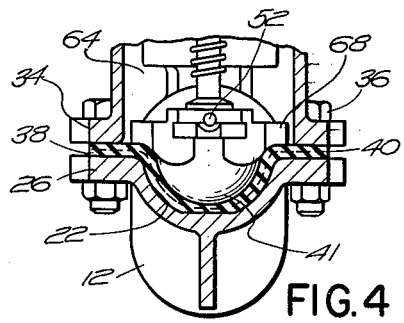
Figure 4 is a vertical transverse sectional view taken substantially along the plane of line 4—4 in Figure 3 but showing the compressor in end elevation.
Figure 5:
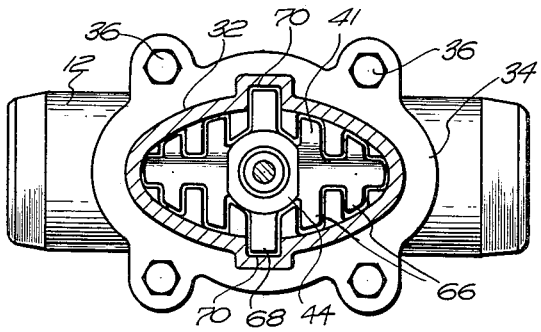
Figure 5 is a horizontal sectional view taken subtantially along the plane of line 5—5 of Figure 1.
Figure 6:
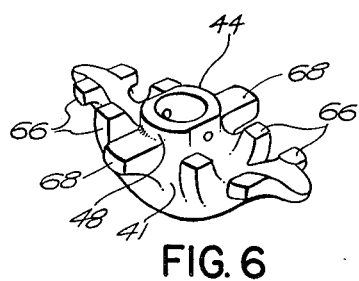
Figure 6 is a detail perspective view of one of my improved compressors.
Figure 7:
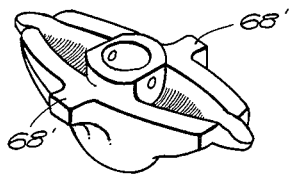
Figure 7 is a detail perspective view of another form of compressor embodying the improvements of the present invention.

The bonnet 32 houses the mechanism by which the diaphragm is moved from the open position of Figures 1 and 2 to the closed position of Figures 3 and 4. The mechanism includes a compressor 41 secured to the back of the diaphragm 38 by means of the threaded stud 42 which has its head embedded in the boss-like portion 44 of the diaphragm which portion in turn is seated in a recess 46 in the compressor 41. The compressor has a hollow, substantially cylindrical portion 48 into which the lower end of the stem or spindle 50 extends for pivotal connection to the compressor by the pin 52. The spindle 50 is externally threaded and is engaged through an internally threaded bushing 54 carried at the top of the bonnet 32. The bushing has an annular shoulder 55 engaging a thrust washer 57 which prevents upward movement of the bushing. A handwheel 56 is disposed above the bonnet 32 and has a central hub 58 secured to the bushing 54 by a screw 60, the hub bearing against the bonnet top surface at 62 so as to prevent downward movement of the handwheel 56 and bushing 54. The interior wall surface of the bonnet 32 is formed with fingers 64 which have their lower edges curved to conform with the back surface of the diaphragm 38 when in its open position so as to provide a backing therefor when the diaphragm is subjected to line pressure. If desired, the integral finger construction can be substituted for by use of a separate finger plate as is known in the art. Of course, where fingers are employed, whether in the integral construction or as a separate finger plate, the compressor may be formed with fingers 66 adapted to pass freely in the spaces between the fingers of the bonnet. The so called continuous-type compressor such as shown in Figure 7; as well as the finger-type compressor, can be employed where no fingers are employed in the bonnet construction. In either case, the compressor is formed with a pair of fingers 68 or 68' along its transverse dimension and with a continuous seating surface thereon substantially complementary to the seating surface of the weir. Also as is conventional, the bonnet is formed on its interior surface with corresponding vertically extending finger grooves 70 for non-rotatably guiding the compressor in its movement between open and closed positions.

From the foregoing description of the valve construction, it will be seen that by rotation of the handwheel 56 the spindle 50 will non-rotatably be moved vertically relative to the bushing and handwheel carrying the compressor 41 therewith. When the compressor 41 is in its open position as in Figures 1 and 2, the diaphragm is substantially completely free of distortion and is backed by the lower edges of the fingers 64 of the bonnet. When the compressor is in its closed position as in Figures 3 and 4, the transverse seating surface of the fingers 68 of the compressor 41 force the diaphragm to distort to seat against the weir seating surface 22. In accordance with the present invention, the remaining surface of the compressor which faces the diaphragm is so contoured as to correspond to the distorted shape of the diaphragm portion that is free of the weir and not clamped between the flanges 26 and 34 so as to provide a backing for the free portion of the diaphragm. In this respect it should be noted that the compressor contour corresponds with the back surface of the diaphragm when the diaphragm is in closed position and free of line pressure.

Figure 3 shows the shape of the diaphragm in longitudinal cross-section when in closed position and it is notable that the shape is quite different from the obverse of the relationship of the diaphragm in open position. Thus, the unnecessary distortion of the diaphragm is substantially obviated.

Turning now to Figures 8–11, the method of making compressors which will fulfill the foregoing objects will now be described. Inasmuch as for different size valves and shapes of diaphragms different results occur, it is necessary to perform the following method in connection with each group of valves.

Figure 8:
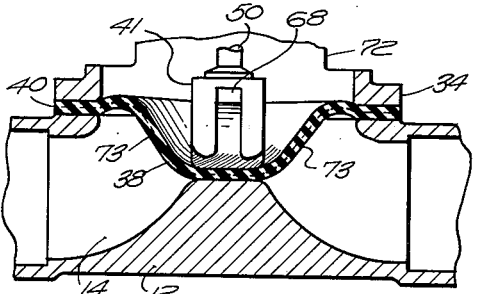
Figure 8 is a somewhat diagrammatic view showing the partially open bonnet and the two-finger compressor employed to effect seating of the diaphragm on the weir, both of which are utilized in carrying out the method of my invention.

First, the bonnet of a standard valve is cut-away as at 72 and a compressor such as 41 is modified by cutting away the end portions leaving the transverse portion provided by the fingers 68. The modified valve compressor is then moved to closed position seating a transverse portion of the diaphragm against the seating surface of the weir, the remaining portion 73 of the diaphragm, except for the peripherally clamped portion, being free and therefore assuming what may be termed a naturally distorted configuration, as shown in Figure 8. Next, a plaster-like mixture is poured into the bonnet and over the back surface of the diaphragm as at 74 and allowed to set as shown in Figure 9. The bonnet along with the compressor is then removed and inverted and a sheet 76 of any suitable material, such as sheet metal, is bent about the periphery of the plaster form 78 and is rested on the flange 34 of the bonnet. Any imperfections in the surface of the plaster and the recess 46 of the compressor are filled with mold makers' wax or other suitable substance. After coating the surface of the plaster form with any suitable parting agent, as for example grease, a female form 80 complementary to the male form 78 is made by pouring more of the plaster-like mixture over the male form as shown in Figure 10. After the female form 80 has set, it is separated from the male form. The form 80 is then transversely and longitudinally sectioned as shown in Figure 11. The number of sections made may be varied but a sufficient number are made so that a mold for the improved compressor can be made in accordance with known practices.

Either the continuous-type compressor or the finger-type compressor can be made with surface portions corresponding to the surface of the form 80. Thus with such a compressor installed in a diaphragm valve, it will be readily realized that when the compressor is moved to a closed position only the seating portion of the diaphragm will be forcibly distorted, the remainder of the diaphragm being free to assume a natural distorted configuration, which will be substantially less of a strain on the diaphragm. The portion of the compressor not used to seat the diaphragm will, however, provide a closely cooperating backing support for the free-diaphragm portions to counteract the line pressure and thereby further relieve stresses that would otherwise shorten the life of the diaphragm.

An important and unexpected advantage of the present invention is that the force required to seat the diaphragm has been greatly reduced, in some cases the reduction of force required being as much as 50% or greater.

Also, it has been found that abrasion, which in the past has brought about many diaphragm failures, has been substantially reduced and this has been especially notable at the portions of the diaphragm remote from the weir-engaging portion.

While I have referred to the use of a plaster-like mixture I have found Tamastone used according to the directions of the manufacturer, The Foundry Division of Tamms Industries, Inc., Chicago, Illinois, is especially satisfactory because of the limited shrinkage upon setting. Plaster of Paris or other similar materials can be used with success.

As this invention may be embodied in several forms without departing from the spirit or essential characteristics thereof, the present embodiment is therefore illustrative and not restrictive, since the scope of the invention is defined in the appended claims rather than by the description preceding them, and all changes that fall within the metes and bounds of the claims or that form their functional as well as conjointly cooperative equivalents, are therefore intended to be embraced by those claims.

This is a division of my copending application S.N. 456,141, filed September 15, 1954 for Diaphragm valves, now Patent No. 2,936,998, dated May 17, 1960.

I claim:

1. A method of making a back up member for a molded diaphragm including; the steps of clamping the periphery of the diaphragm beneath a valve bonnet to prevent movement; then forcing the diaphragm from its molded position to a distorted position by forcing the diaphragm over a portion lesser in area than the remaining unclamped area, the distorted position being unpredictable; pouring a plaster-like mixture into the bonnet over the back surface of the distorted diaphragm; permitting said mixture to set thus forming a replica of the shape of the distorted diaphragm; removing said bonnet with said replica and inverting said bonnet with said replica; enclosing said replica and the inner periphery of said bonnet; coating said replica with a parting agent; pouring a plaster-like mixture over said replica in said bonnet; permitting said mixture to set and removing said set mixture thus obtaining a female form of a diaphragm in its naturally distorted closed position.

2. A method of making a compressor for a diaphragm type valve including; the steps of clamping the periphery of a molded open diaphragm beneath a valve bonnet to prevent movement; then forcing the normally convex back face of the diaphragm over a portion lesser in area than the remaining unclamped area, the back surface assuming an unpredictable configuration; pouring a plaster-like mixture into the bonnet over the back surface of the distorted diaphragm; permitting said mixture to set thus forming a replica of the shape of the distorted diaphragm; removing said bonnet with said replica and inverting said bonnet with said replica; enclosing said replica and the inner periphery of said bonnet; coating said replica with a parting agent; pouring a plaster-like mixture over said replica in said bonnet; permitting said mixture to set and removing said set mixture thus obtaining a female form of a diaphragm in its naturally distorted closed position.

3. A method of making a compressor for a diaphragm type valve having a weir including; the steps of distorting a molded open diaphragm held between the valve body and the valve bonnet to its closed position by forcing only that portion of the diaphragm's back face which is complementary to the weir against the weir, the shape assumed by the back face being unpredictable; pouring a plaster-like mixture into the bonnet over the back surface of the distorted diaphragm; permitting said mixture to set thus forming a replica of the shape of the distorted diaphragm; removing said bonnet with said replica and inverting said bonnet with said replica; enclosing said replica and the inner periphery of said bonnet; coating said replica with a parting agent; pouring a plaster-like mixture over said replica in said bonnet; permitting said mixture to set and removing said set mixture thus obtaining a female form of a diaphragm in its naturally distorted closed position.

4. A method of making a compressor for a diaphragm type valve having a passageway across which extends a transverse weir, the method including; the steps of clamping the periphery of a molded open diaphragm beneath a valve bonnet to prevent movement; distorting the diaphragm to its closed position by forcing only a transverse portion complementary to the top weir surface against the top of the weir; pouring a plaster-like mixture into the bonnet over the back surface of the distorted diaphragm; permitting said mixture to set thus forming a replica of the shape of the distorted diaphragm; removing said bonnet with said replica and inverting said bonnet with said replica; enclosing said replica and the inner periphery of said bonnet; coating said replica with a parting agent; pouring a plaster-like mixture over said replica in said bonnet; permitting said mixture to set and removing said set mixture thus obtaining a female form of a diaphragm in its naturally distorted closed position.

References Cited in the file of this patent

UNITED STATES PATENTS

| | | |
|---|---|---|
| 2,383,706 | Burger et al. | Aug. 28, 1945 |
| 2,465,019 | Johnson | Mar. 22, 1949 |
| 2,495,402 | Bentsen | Jan. 24, 1950 |
| 2,581,489 | Kilham | Jan. 8, 1952 |